United States Patent
Simoes et al.

(10) Patent No.: US 8,550,811 B2
(45) Date of Patent: Oct. 8, 2013

(54) METHOD FOR FEEDING HOT GAS TO A SHAFT FURNACE

(75) Inventors: Jean-Paul Simoes, Walferdange (LU); Jean-Luc Roth, Thionville (FR)

(73) Assignee: Paul Wurth S.A., Luxembourg (LU)

( * ) Notice: Subject to any disclaimer, the term of this patent is extended or adjusted under 35 U.S.C. 154(b) by 206 days.

(21) Appl. No.: 13/257,116

(22) PCT Filed: Mar. 15, 2010

(86) PCT No.: PCT/EP2010/053305
§ 371 (c)(1),
(2), (4) Date: Sep. 16, 2011

(87) PCT Pub. No.: WO2010/106026
PCT Pub. Date: Sep. 23, 2010

(65) Prior Publication Data
US 2012/0009534 A1    Jan. 12, 2012

(30) Foreign Application Priority Data
Mar. 17, 2009 (LU) .......................................... 91542

(51) Int. Cl.
*F23N 1/02* (2006.01)
(52) U.S. Cl.
USPC ........... 431/12; 431/62; 431/90; 137/6; 137/7
(58) Field of Classification Search
USPC ................ 431/12, 19, 62, 63, 89, 90; 137/6, 137/7, 111, 112, 113, 114
See application file for complete search history.

(56) References Cited

U.S. PATENT DOCUMENTS 3,002,738 A    10/1961 Rice
4,111,637 A  *  9/1978 Hillman, II ...................... 431/12
8,381,756 B2  *  2/2013 Sakane et al. .................. 137/112

FOREIGN PATENT DOCUMENTS

GB   807176      1/1959
JP   58067812 A  4/1983

OTHER PUBLICATIONS

International Search Report PCT/EP2010/053305; Dated Apr. 16, 2010.

* cited by examiner

*Primary Examiner* — Alfred Basichas
(74) *Attorney, Agent, or Firm* — Cantor Colburn LLP

(57) ABSTRACT

The present invention proposes a method for feeding hot gas to a shaft furnace (12), wherein the method comprises feeding a first portion (32) of a first gas flow (24) to a mixing chamber (36) and feeding a second portion (34) of the first gas flow (24) into said shaft furnace. The method further comprises feeding a second gas flow (28) to the mixing chamber (36), allowing the first portion (32) of the first gas flow (24) to mix with the second gas flow (28) in the mixing chamber (36), thereby forming a third gas flow (38), and feeding the third gas flow (38) to the shaft furnace (12). The first gas flow (24) has a first volumetric fluid flow rate ($V_1$), a first temperature ($T_1$) and a first pressure ($p_1$); the second gas flow (28) has a second volumetric fluid flow rate ($V_2$), a second temperature ($T_2$) and a second pressure ($p_2$); and the third gas flow (38) has a third volumetric fluid flow rate ($V_3$), a third temperature ($T_3$) and a third pressure ($p_3$). According to an important aspect of the present invention, the first temperature ($T_1$) is higher than the second temperature ($T_2$) and the first pressure ($p_1$) is lower than the second pressure ($p_2$) and the third temperature ($T_3$) is regulated by controlling the second pressure ($p_2$).

13 Claims, 1 Drawing Sheet

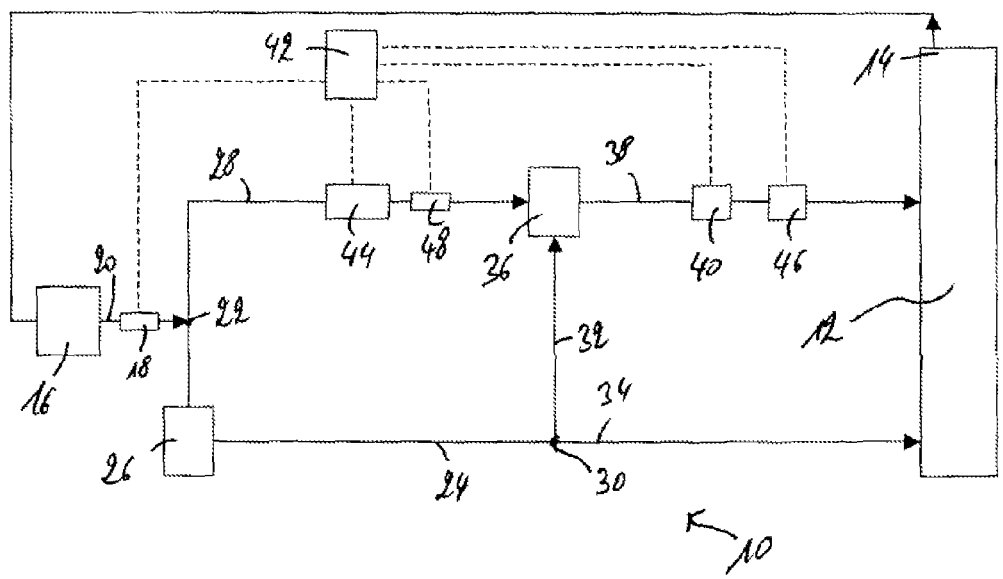

METHOD FOR FEEDING HOT GAS TO A SHAFT FURNACE

TECHNICAL FIELD

The present invention generally relates to a method for feeding hot gas to a shaft furnace.

BACKGROUND

In shaft furnaces, reducing gas is generally injected into the shaft furnace for aiding the reduction of ore in the shaft furnace.

The injected reducing gas may be formed by mixing two separate gas flows before injection. This may be done in order to obtain a desired gas composition or gas temperature. The mixing necessitates controlling the feeding of two separate gas flows to a mixing chamber. Generally, control valves such as e.g. butterfly valves, are arranged in the feeding conduits of the gas flows, so as to allow the correct amount of gas from each gas flow into the mixing chamber and thereby obtain the desired mixing rate of the two separate gas flows.

In applications where the incoming gas flow comprises an aggressive gas or a particularly hot gas, the control valve is exposed to such extreme conditions that the correct working and the lifetime of the control valve is compromised. The incoming gas flow may e.g. comprise a recycled furnace top gas at a temperature above 1000° C.

Control valves exposed to high temperatures are usually provided with a cooling system in order to prevent damage to the control valve through the high gas temperature. An undesired effect of this is that the gas temperature may be lowered as it passes through the control valve. Thermal insulation, which may be provided on the control valve, comprises a variety of different materials and has to be heat resistant and at the same time allow fast gas temperature and pressure changes. Last but not least, the control valve should have good sealing properties when closing and ensure low pressure losses while regulating the gas flow rate.

The reliability and durability of control valves is compromised by the exposure to such extreme conditions. Such control valves not only have high manufacturing costs, but also require intensive and frequent maintenance operations.

BRIEF SUMMARY

The invention provides an improved method for feeding hot gas to a shaft furnace, in particular an alternative method for controlling the mixing of two gas flows.

The present invention proposes a method for feeding hot gas to a shaft furnace, wherein the method comprises feeding a first portion of a first gas flow to a mixing chamber, feeding a second portion of the first gas flow into the shaft furnace, feeding a second gas flow to a mixing chamber, allowing the first portion of the first gas flow to mix with the second gas flow in the mixing chamber, thereby forming a third gas flow, and feeding the third gas flow to the shaft furnace. The first gas flow has a first volumetric fluid flow rate, a first temperature and a first pressure; the second gas flow has a second volumetric fluid flow rate, a second temperature and a second pressure; and the third gas flow has a third volumetric fluid flow rate, a third temperature and a third pressure. According to an important aspect of the present invention, the first temperature is higher than the second temperature and the first pressure is lower than the second pressure and the third temperature is regulated by controlling the second pressure.

The controlling of the second pressure in order to regulate the third temperature makes it possible to keep control valves and measurement devices out of the first gas flow, which is very hot and could damage these elements. Indeed, all of the measuring and regulating can, according to the present invention, be carried out on the "cold side" of the system. The necessary measurement and control components need not be designed so as to withstand the extreme conditions reigning in the first gas flow. As the control valves are not exposed to extreme conditions, their reliability and durability is not compromised. The manufacturing costs of the control valves can be reduced. Last but not least, intensive and frequent maintenance operations to service the control valves can also be reduced.

According to the invention, the first gas flow is divided into a first portion and a second portion, the first portion being fed to the mixing chamber. As only a first portion of the first gas flow is fed to the mixing chamber, the remainder of the first gas flow, i.e. the second portion of the first gas flow, can be directly fed into the shaft furnace. If the second pressure of the second gas flow is controlled in such a way as to reduce the amount of first gas flow entering the mixing chamber, the amount of first gas flow flowing through the second portion is increased. This allows avoiding a backflow of gas through the conduit carrying the first gas flow. More importantly, there is no need to arrange any control or regulating valves in the "hot side" of the system and the hot second portion of the first gas flow is controlled by the valves on the "cold side" of the system.

Preferably, the third temperature is measured in a conduit carrying the third gas flow; and, based on the measured third temperature, the second pressure is controlled in a conduit carrying the second gas flow, in such a way as to bring the third temperature in line with a predetermined nominal temperature. Advantageously, if the third temperature is above the nominal temperature, the second pressure is increased to lower the third temperature; and, if the third temperature is below the nominal temperature, the second pressure is decreased to raise the third temperature.

A control unit may be provided for monitoring the third temperature. A temperature signal may be fed from a temperature sensor in the conduit carrying the third gas flow to the control unit, wherein this temperature signal may be used to compare the third temperature to the predetermined nominal temperature. If the third temperature deviates from the nominal temperature, the second pressure is adjusted in such a way that the third temperature approaches the nominal temperature.

The third gas flow may be fed to the shaft furnace at a location of the shaft furnace above the melting zone. For introduction into the shaft furnace at a location above the melting zone, the third temperature is preferably no more than 950° C.

The second portion of the first gas flow may be fed to the shaft furnace at the hearth tuyere level of the shaft furnace. The portion of the first gas flow not entering the mixing chamber is injected into the shaft furnace as reducing gas.

According to a preferred embodiment of the invention, an incoming gas flow is, at a distribution point, divided into the first gas flow and the second gas flow, the first gas flow being heated to a temperature above the second gas flow. The incoming gas flow may comprise recycled top gas coming from the shaft furnace, such top gas will generally have gone through some processes wherein the top gas will have been cleaned, treated and cooled. The incoming gas flow may e.g. have passed a PSA or VPSA installation to remove the majority of $CO_2$ gas contained in the top gas. This incoming gas flow is then divided into a first gas flow which is again heated to a high temperature, generally above 1000° C., and a second gas flow which remains at the cooler temperature.

The incoming gas flow has a volumetric fluid flow rate which can preferably be measured upstream of the distribution point.

The flow rate of the first gas flow can be determined by comparing the flow rates of the incoming gas flow and the second gas flow, both measures on the "cold side" of the system.

The first gas flow is advantageously heated in a hot stove, such as e.g. a Cowper. This allows the temperature of the first gas flow to be raised up to a temperature of about 1250° C.

According to a further embodiment of the present invention, the third volumetric fluid flow rate is controlled my means of a control valve arranged in a conduit carrying the third gas flow. Such a control valve can regulate the flow rate of gas fed into the shaft furnace at a location of the shaft furnace above the melting zone. As the temperature in the third gas flow is preferably kept below 950° C., the control valve is not exposed to extreme conditions and its reliability and durability is therefore not compromised.

It should be noted that the regulation of the flow rate of the third gas flow also has an influence on the third temperature of the third gas flow. As it is generally a desire to keep the third temperature at a predetermined temperature, the second pressure is controlled in a conduit carrying the second gas flow, in such a way as to bring the third temperature back in line with a predetermined desired temperature.

The first volumetric fluid flow rate can advantageously be determined by comparing the volumetric fluid flow rates in the incoming gas flow and in the second gas flow. All flow rate measurements are carried out on the "cold side" of the system such that the flow rate measuring device is not exposed to extreme heat conditions. There is no need to provide a flow rate measuring device for the first gas flow.

Alternatively, the first volumetric flow rate of the first gas flow may be determined by measuring the flow rate of the first gas flow upstream of a heater for heating the first gas flow, i.e. between the distribution point and such a heater. The flow rate of the first gas flow is therefore also measured on its "cold side".

The volumetric fluid flow rate in the second portion of the first gas flow is also advantageously regulated by means of the control valve arranged in a conduit carrying the third gas flow based on the determined first volumetric fluid flow rate. By setting the third volumetric flow rate and measuring the second volumetric flow rate, the flow rate of the first portion of the first gas flow can be deducted. The deduction of the first volumetric flow rate and the flow rate of the first portion of the first gas flow, the second portion of the first gas flow can also be deducted. The regulation of the third volumetric flow rate has an influence on the flow rate of the second portion of the first gas flow. As a consequence, the flow rate of the second portion of the first gas flow, i.e. the gas injected into the shaft furnace at the hearth tuyere level, can be regulated and measured using the control valve in the conduit carrying the third gas flow, i.e. without providing a control valve or measuring device in the "hot side" of the system.

BRIEF DESCRIPTION OF THE DRAWINGS

A preferred embodiment of the invention will now be described, by way of example, with reference to the accompanying drawing, in which FIG. 1 is a schematic diagram illustrating a system for implementing the method according to the present invention.

DETAILED DESCRIPTION

The present invention is illustrated by referring to a system for reintroducing recycled furnace top gas back into the shaft furnace. It will be understood that there is no intention to limit the protection sought to this particular application.

FIG. 1 shows a gas feeding system 10 comprising a shaft furnace 12, such as e.g. a blast furnace, at the top end 14 of which top gas is extracted. This top gas goes through one or more treatment devices wherein top gas may be treated or cleaned. One such treatment device may e.g. be a Pressure Swing Adsorption (PSA) or Vacuum Pressure Swing Adsorption (VPSA) installation 16, as shown in the FIGURE, wherein $CO_2$ is extracted from the top gas and wherein the temperature of the top gas is lowered. The volumetric fluid flow rate $V_i$ of the incoming gas flow 20 may be determined by a first flow rate measuring device 18 arranged in the conduit downstream of the PSA installation 16.

The incoming gas flow is then divided, at a first distribution point 22, into two gas flows. A first gas flow 24 has, after passing through a heater 26, a first volumetric fluid flow rate $V_1$, a first temperature and a first pressure $p_1$. A second gas flow 28 has a second volumetric fluid flow rate $V_2$, a second temperature $T_2$ and a second pressure $p_2$. At a second distribution point 30, the first gas flow 24 is again divided into a first portion 32 of first gas flow and a second portion 34 of first gas flow. The "hot" gas from the first portion 32 of first gas flow and the "cold" gas from the second gas flow 28 are both fed to a mixing chamber 36, wherein both gas flows are mixed and form a third gas flow 38 having a third volumetric fluid flow rate $V_3$, a third temperature $T_3$ and a third pressure $p_3$.

The third gas flow 38 is injected back into the shaft furnace 12 at a location of the shaft furnace above the melting zone. The second portion 34 of first gas flow is injected back into the shaft furnace 12 at the hearth tuyere level of the shaft furnace.

It is desired to inject the recycled top gas back into the shaft furnace 12 at a particular temperature. Therefore it is necessary to regulate the third temperature $T_3$ of the third gas flow 38. This is generally achieved by control valves in both the first and second gas flows 24, 28. According to the method of the present invention, the third temperature $T_3$ is regulated by controlling the second pressure $p_2$ of the second gas flow 28. Indeed, due to the heater 26, e.g. a hot stove, for heating the first gas flow 24 from about 40° C. to about 1250° C., the first temperature $T_1$ is higher than the second temperature $T_2$ and the first pressure $p_1$ is lower than the second pressure $p_2$. When the second pressure $p_2$ is increased, the second volumetric fluid flow rate $V_2$ into the mixing chamber 36 is increased; at the same time, the first volumetric fluid flow rate $V_1$ into the mixing chamber 36 is decreased because $p_1 < p_2$. It follows that more "cold" gas and less "hot" gas flows into the mixing chamber 36. The gas exiting the mixing chamber 36 therefore has a lower third temperature $T_3$. Similarly, when the second pressure $p_2$ is decreased, the second volumetric fluid flow rate $V_2$ into the mixing chamber 36 is decreased; at the same time, the first volumetric fluid flow rate $V_1$ into the mixing chamber 36 is increased, resulting in more "hot" gas entering the mixing chamber 36 and thereby raising the third temperature $T_3$. To this effect, a temperature sensor 40 is arranged for measuring the third temperature $T_3$ of the third gas flow 38. The temperature sensor 40 is linked to a control unit 42, which compares the measured third temperature $T_3$ with a predetermined nominal temperature. Based on the comparison, the control unit 42 instructs a pressure regulating device 44 to increase or decrease the second pressure $p_2$ accordingly, i.e. in such a way as to bring the third temperature $T_3$ in line with the nominal temperature. The pressure regulating device 44 may be in the form of a control valve regulating the flow rate of the second gas flow. Other means for regulating the pressure of the second gas flow may however also be considered.

Due to the above method for regulating the mixing rate of the first and second gas flows 24, 28 within the mixing chamber 36, no control valves need be installed in the "hot side" of the gas flows, i.e. in the first gas flow 24 or in the first and second potions 32, 34 of the first gas flow. Indeed, within the hot side nothing is regulated or measured. It is thereby possible to keep control valves out of the hot side, wherein they would otherwise be subjected to extreme conditions due to the very high temperature. The present method allows for all regulation and measurement devices to be installed on the "cold side" of the system, i.e. in the second and third gas flows 28, 38 wherein the temperature of the gas is kept below 950° C.

In order to regulate the third volumetric fluid flow rate $V_3$ of the third gas flow 38, a control valve 46 may be installed in the third gas flow 38. Together with the first flow rate measuring device 18 in the incoming gas flow 20 and a second flow rate measuring device 48 in the second gas flow 28, the control valve 46 can be used to determine and regulate the third volumetric fluid flow rate $V_3$ of the third gas flow 38 and also the volumetric fluid flow rate $V_{1.2}$ of the second portion 34 of the first gas flow. The amount of gas injected into the shaft furnace at both levels may therefore be regulated.

It should be noted that regulating the third volumetric fluid flow rate $V_3$ of the third gas flow 38 has an influence on the third temperature $T_3$ and that the control unit 42 needs to instruct the pressure regulating device 44 in such a way as to bring the third temperature $T_3$ in line with the nominal temperature.

The control unit 42 may be connected to the first flow rate measuring device 18 and to the second flow rate measuring device 48 for respectively receiving signals representative of the incoming flow rate and the second flow rate. The control unit 42 may further be connected to the control valve 46 for regulating the third volumetric fluid flow rate $V_3$ and/or the volumetric fluid flow rate $V_{1.2}$ of the second portion 34 of the first gas flow.

The invention claimed is:

1. Method for feeding hot gas to a shaft furnace, comprising:
    feeding a first portion of a first gas flow to a mixing chamber, said first gas flow having a first volumetric fluid flow rate, a first temperature and a first pressure;
    feeding a second portion of the first gas flow into said shaft furnace;
    feeding a second gas flow to the mixing chamber, said second gas flow having a second volumetric fluid flow rate, a second temperature and a second pressure;
    allowing said first portion of said first gas flow to mix with said second gas flow in said mixing chamber, thereby forming a third gas flow, said third gas flow having a third volumetric fluid flow rate, a third temperature and a third pressure; and
    feeding said third gas flow to said shaft furnace;
    wherein: said first temperature is higher than said second temperature and said first pressure is lower than said second pressure; said third temperature is regulated by adjusting said second pressure by a pressure regulating device arranged in said second gas flow; and said first gas flow is exempt of pressure regulating devices.

2. Method according to claim 1, wherein a control valve in said third gas flow is used to regulate said third volumetric fluid flow rate and a volumetric fluid flow rate of said second portion of said first gas flow, wherein said second portion of said first gas flow is exempt of pressure regulating devices.

3. Method according to claim 1, wherein said third temperature is measured in a conduit carrying said third gas flow; and based on said measured third temperature, said second pressure is controlled in a conduit carrying said second gas flow, in such a way as to bring said third temperature in line with a predetermined nominal temperature.

4. Method according to claim 3, wherein if said third temperature is above said nominal temperature, said second pressure is increased to lower said third temperature; and if said third temperature is below said nominal temperature, said second pressure is decreased to raise said third temperature.

5. Method according to claim 1, wherein said third gas flow is fed to said shaft furnace at a location of the shaft furnace above a melting zone.

6. Method according to claim 1, wherein said second portion of said first gas flow is fed to said shaft furnace at a hearth tuyere level of the shaft furnace.

7. Method according to claim 1, wherein an incoming gas flow is, at a distribution point, divided into said first gas flow and said second gas flow, said first gas flow being heated to a temperature above said second gas flow.

8. Method according to claim 7, wherein said incoming gas flow has a volumetric fluid flow rate which can be measured upstream of said distribution point.

9. Method according to claim 1, wherein said first gas flow is heated in a hot stove.

10. Method according to claim 1, wherein said third volumetric fluid flow rate is controlled by a control valve arranged in a conduit carrying said third gas flow.

11. Method according to claim 7, wherein said first volumetric fluid flow rate can be determined by comparing the volumetric fluid flow rates in said incoming gas flow and said second gas flow.

12. Method according to claim 10, wherein the volumetric fluid flow rate in said second portion of said first gas flow is regulated by said control valve arranged in a conduit carrying said third gas flow based on said determined first volumetric fluid flow rate.

13. Method according to claim 11, wherein the volumetric fluid flow rate in said second portion of said first gas flow is regulated by said control valve arranged in a conduit carrying said third gas flow based on said determined first volumetric fluid flow rate.

* * * * *